US008034436B2

(12) United States Patent
Wei

(10) Patent No.: US 8,034,436 B2
(45) **Date of Patent: *Oct. 11, 2011**

(54) FLUORESCENT ARTICLE HAVING MULTIPLE LAYERS

(75) Inventor: Guang-Xue Wei, Buffalo Grove, IL (US)

(73) Assignee: Avery Dennison Corporation, Pasadena, CA (US)

( * ) Notice: Subject to any disclaimer, the term of this patent is extended or adjusted under 35 U.S.C. 154(b) by 637 days.

This patent is subject to a terminal disclaimer.

(21) Appl. No.: 11/586,272

(22) Filed: Oct. 25, 2006

(65) Prior Publication Data

US 2008/0182110 A1 Jul. 31, 2008

Related U.S. Application Data

(63) Continuation-in-part of application No. 10/354,515, filed on Jan. 30, 2003, and a continuation-in-part of application No. 10/135,537, filed on Apr. 30, 2002.

(60) Provisional application No. 60/730,616, filed on Oct. 27, 2005.

(51) Int. Cl.

| | |
|---|---|
| ***B32B 7/02*** | (2006.01) |
| ***B32B 27/08*** | (2006.01) |
| ***B32B 27/18*** | (2006.01) |
| ***B32B 27/30*** | (2006.01) |
| ***G32B 5/12*** | (2006.01) |

(52) U.S. Cl. ........ 428/212; 428/412; 428/522; 359/350; 359/515; 359/529; 359/534; 252/301.35

(58) Field of Classification Search ........................ None
See application file for complete search history.

(56) References Cited

U.S. PATENT DOCUMENTS

| | | | | | |
|---|---|---|---|---|---|
| 3,058,003 | A | | 10/1962 | Michlin | |
| 3,830,682 | A | | 8/1974 | Rowland | |
| 4,149,902 | A | * | 4/1979 | Mauer et al. | 136/247 |
| 4,477,521 | A | * | 10/1984 | Lehmann et al. | 428/336 |
| 4,486,363 | A | | 12/1984 | Pricone et al. | |
| 4,601,861 | A | | 7/1986 | Pricone et al. | |
| 4,956,558 | A | * | 9/1990 | Batishko et al. | 250/461.1 |
| 5,005,873 | A | * | 4/1991 | West | 283/92 |
| 5,117,304 | A | | 5/1992 | Huang et al. | |
| 5,387,458 | A | | 2/1995 | Pavelka | |
| 5,422,189 | A | * | 6/1995 | Warner et al. | 428/480 |

(Continued)

FOREIGN PATENT DOCUMENTS

EP 0 781 989 * 7/1997

(Continued)

OTHER PUBLICATIONS

International Search Report for corresponding PCT/US2006/041648 completed Apr. 18, 2007 by G. Giannitsopoulos of the EPO.

*Primary Examiner* — Vivian Chen

(57) ABSTRACT

A fluorescent article includes an underlayer colored fluorescent film and an overlayer colored fluorescent film, which is provided over the underlayer colored fluorescent film. The underlayer colored fluorescent film includes a first fluorescent colorant in an underlayer polymer matrix. The overlayer colored fluorescent film includes a second fluorescent colorant in an overlayer polymer matrix. The second fluorescent colorant in the overlayer film at least partially blocks light in a first wavelength range while allowing transmission of an amount of light in a second wavelength range effective to make the first fluorescent colorant fluoresce.

24 Claims, 3 Drawing Sheets

U.S. PATENT DOCUMENTS

| | | | | | |
|---|---|---|---|---|---|
| 5,427,842 | A | * | 6/1995 | Bland et al. | 428/213 |
| 5,605,761 | A | | 2/1997 | Burns et al. | |
| 5,614,286 | A | | 3/1997 | Bacon, Jr. et al. | |
| 5,672,643 | A | * | 9/1997 | Burns et al. | 524/90 |
| 5,674,622 | A | * | 10/1997 | Burns et al. | 428/412 |
| 5,754,337 | A | | 5/1998 | Burns et al. | |
| 5,783,307 | A | * | 7/1998 | Fagerburg et al. | 428/412 |
| 5,920,429 | A | * | 7/1999 | Burns et al. | 359/515 |
| 6,001,936 | A | | 12/1999 | Barrera et al. | |
| 6,015,214 | A | | 1/2000 | Heenan et al. | |
| 6,110,566 | A | | 8/2000 | White et al. | |
| 6,251,963 | B1 | | 6/2001 | Kohler et al. | |
| 6,312,132 | B1 | | 11/2001 | Pavelka et al. | |
| 6,375,776 | B1 | * | 4/2002 | Buoni et al. | 156/209 |
| 6,464,898 | B1 | | 10/2002 | Tomoike et al. | |
| 6,514,594 | B1 | * | 2/2003 | Wei et al. | 428/141 |
| 6,531,205 | B1 | * | 3/2003 | Buoni et al. | 428/156 |
| 6,652,954 | B2 | * | 11/2003 | Nielsen et al. | 428/143 |
| 6,682,810 | B1 | * | 1/2004 | Jones et al. | 428/323 |
| 6,962,670 | B1 | * | 11/2005 | Hanson et al. | 264/21 |
| 6,972,147 | B1 | * | 12/2005 | Wei et al. | 428/141 |
| 7,067,561 | B2 | * | 6/2006 | Bowe | 518/706 |
| 7,264,880 | B2 | * | 9/2007 | Wei et al. | 428/412 |
| 7,674,515 | B2 | * | 3/2010 | Wei | 428/172 |
| 2003/0203211 | A1 | * | 10/2003 | Wei et al. | 428/412 |
| 2003/0203212 | A1 | * | 10/2003 | Wei et al. | 428/412 |
| 2007/0184278 | A1 | * | 8/2007 | Wei et al. | 428/411.1 |
| 2008/0095987 | A1 | * | 4/2008 | Wei | 428/172 |
| 2010/0290119 | A1 | * | 11/2010 | Wei | 359/530 |

FOREIGN PATENT DOCUMENTS

| | | | | |
|---|---|---|---|---|
| EP | 1 008 440 | A2 | | 6/2000 |
| GB | 2 300 596 | A | | 11/1996 |
| JP | 08-252882 | | * | 10/1996 |
| WO | WO 93/01581 | A | | 1/1993 |
| WO | WO 98/14802 | A1 | | 4/1998 |
| WO | WO 99/20688 | A | | 4/1999 |
| WO | WO 99/48961 | A2 | | 9/1999 |
| WO | WO 00-20220 | | * | 4/2000 |
| WO | WO 00/47407 | A1 | | 8/2000 |

* cited by examiner

FLUORESCENT ARTICLE HAVING MULTIPLE LAYERS

RELATED APPLICATIONS

The present application claims priority from U.S. Provisional Patent Application No. 60/730,616, filed Oct. 27, 2005, and is a Continuation-In-Part of U.S. patent application Ser. Nos. 10/354,515, filed Jan. 30, 2003, and 10/135,537, filed Apr. 30, 2002, all of which are incorporated herein by reference in their entireties.

FIELD OF THE INVENTION

The present invention relates to a fluorescent article, and, more particularly, to a fluorescent retroreflective article comprising multiple fluorescent layers.

BACKGROUND

Articles incorporating fluorescent colorants into polymeric matrices can be used for various applications including signage, vehicle markings, roadway markings, and other applications where high visibility is desired, such as information dissemination, visibility, visual signaling, and quick detection. The extraordinarily bright appearance of fluorescent materials is what provides this enhanced visibility, which is especially pronounced at dawn and dusk.

Fluorescent colorants that can be potentially used in outdoor signage can have poor UV-light stability and can fade upon exposure to certain wavelengths of visible light. This can potentially degrade the long-term outdoor durability of the signage. A UV-light screening layer can be provided on a base fluorescent polymer matrix layer to mitigate exposure to UV-light and enhance outdoor durability. The UV-light screening layer can be made by dissolving UV-light absorbing compounds into a transparent polymer matrix. U.S. Pat. No. 5,387,458 and Japan Patent Publication No. 2-16042 (Application No. 63-165914) disclose fluorescent articles consisting of an ultraviolet light screen layer disposed in front of a fluorescent color layer. The screen layer contains UV absorbing compounds that absorb a defined range of UV-light (e.g., wavelength of about 290 nm to about 400 nm). The screen layer, however, does not substantially block visible light that can cause substantial fading of fluorescent colorants in the polymer matrix.

To date, fluorescent colorants are available in only a limited range of hues. For example, fluorescent colorants are commercially available in hues, such as fluorescent red, fluorescent orange, fluorescent pink, and fluorescent yellow-green. A fluorescent yellow that meets the chromaticity requirements of the Commission Internationale de l'eclairage (CIE) and the Federal Highway Administration (FHWA) is not readily available.

SUMMARY OF THE INVENTION

The present invention relates to a fluorescent article that includes an underlayer colored fluorescent film and an overlayer colored fluorescent film, which is provided over the underlayer colored fluorescent film. The underlayer colored fluorescent film includes a first fluorescent colorant in an underlayer polymer matrix. The overlayer colored fluorescent film includes a second fluorescent colorant in an overlayer polymer matrix. The second fluorescent colorant in the overlayer film at least partially blocks light in a first wavelength range while allowing transmission of an amount of light in a second wavelength range effective to make the first fluorescent colorant fluoresce.

In an aspect of the invention, the underlayer film can have a greater fluorescent color stability than the overlayer film.

In another aspect of the invention, the first fluorescent colorant can have a first chemistry and the second fluorescent colorant can have a second chemistry different than the first chemistry. The second chemistry of the second fluorescent colorant is substantially more compatible with the overlayer polymer matrix than the first chemistry of the first fluorescent colorant.

In a further aspect of the invention, the second fluorescent colorant can substantially block visible light from about 450 nm to about 540 nm and allow substantial transmission of visible light with a wavelength greater than about 540 nm. The amount of visible light that is blocked by the second fluorescent colorant can be effective to at least partially mitigate degradation of the underlayer colored fluorescent film In another aspect of the invention, the fluorescent article can further comprise retroreflective elements. The retroreflective elements can be formed into a surface of the underlayer colored fluorescent film opposite the overlayer colored fluorescent film.

In yet another aspect of the invention, the fluorescent article can comprise a cap layer that can overlie the overlayer colored fluorescent film.

A further aspect of the invention relates to a fluorescent yellow retroreflective article that includes an underlayer fluorescent yellow-green film and an overlayer fluorescent orange film provided over the underlayer fluorescent yellow-green film. The underlayer fluorescent yellow-green film includes at least one fluorescent dye dissolved within an underlayer polymer matrix. The underlayer polymer matrix can include a polycarbonate. The overlayer fluorescent orange film includes at least one fluorescent dye dissolved within an overlayer polymer matrix. The overlayer polymer matrix can include an acrylic resin.

The fluorescent yellow-green coloration of the underlayer fluorescent yellow-green film can be provided by a fluorescent dye comprising at least one yellow-green shade fluorescent dye selected from the group consisting of benzothiazine, thioxanthene, and benzoxanthene. The fluorescent orange coloration of the overlayer fluorescent orange film can be provided by a fluorescent dye comprising at least one of orange shade fluorescent dye and/or red shade perylene dye.

BRIEF DESCRIPTION OF THE DRAWINGS

The foregoing and other embodiments will become apparent to those skilled in the art upon reading the following description with reference to the accompanying drawings.

DETAILED DESCRIPTION

Figure 1:
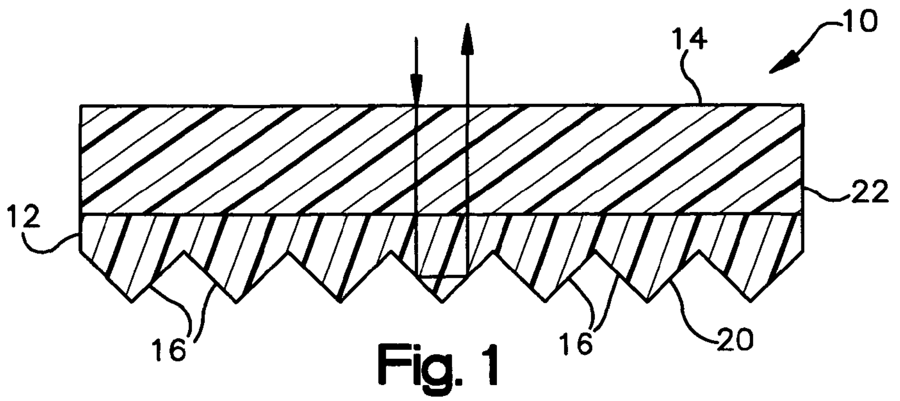
FIG. 1 illustrates a cross-sectional view of a fluorescent sheeting having multiple colored film layers in accordance with an aspect of the invention.

The present invention relates to a fluorescent article, such as a fluorescent retroreflective sheeting, that includes multiple film (or sheeting) layers, which provide superior light stability and target fluorescent coloration parameters. Various embodiments of the invention are illustrated in the drawings. In each instance, an overlayer colored fluorescent film having a first coloration is combined with an underlayer colored fluorescent film having a second coloration different than the first coloration to provide a colored fluorescent sheeting or film with a target coloration and superior fluorescence color stability after prolonged outdoor exposure.

If retroreflective properties are desired, retroreflective elements commonly used in the retroreflective sheeting industry, such as microprismatic cube corner elements or glass microspheres, can be designed into the article. When a retroreflective fluorescent article is fabricated into, for example, a road sign, light from the headlights of oncoming vehicles enters the multilayered fluorescent article, through a front face thereof, the overlayer and underlayer colored fluorescent films, to the retroreflective elements, and is retroreflected back to the driver of the vehicle.

FIG. 1 illustrates a multiple layered fluorescent retroreflective sheeting 10 in accordance with an aspect of the invention. The fluorescent retroreflective sheeting 10 can be a fluorescent yellow retroreflective sheeting that is used in applications, such as signage, vehicle markings, roadway markings, and other applications where high visibility is desired. By fluorescent yellow, it is meant a color that is within the area defined by four sets of Commission Internationale de l'eclairage (CIE) chromaticity coordinates: (x=0.479, y=0.520), (x=0.446, y=0.483), (x=0.512, y=0.421), and (x=0.557, y=0.442). Any color having chromaticity coordinates falling within the area defined by these four sets of chromaticity coordinates is defined as "fluorescent yellow" in the CIE system.

The fluorescent retroreflective sheeting 10 includes an underlayer colored fluorescent film 12, an overlayer colored fluorescent film 14, and a plurality of retroreflective elements 16. By "overlayer" and "underlayer" it is meant the position of the films with respect to light incident the fluorescent retroreflective sheeting 10. The overlayer colored fluorescent film 14 is provided over the underlayer colored fluorescent film 12 so that light incident the fluorescent retroreflective sheeting 10 passes through the overlayer colored fluorescent film 14 before passing through the underlayer colored fluorescent film 12.

The retroreflective elements 16 can be incorporated into a surface 20 of the underlayer colored fluorescent film 12 that is opposite to and laterally displaced from a surface 22 of the underlayer colored fluorescent film 12 on which is disposed the overlayer colored fluorescent film 14. Examples of retroreflective elements 16 that be used include microprismatic cubes elements and spheres, such as described in U.S. Pat. Nos. 4,588,258 and 4,775,219, herein incorporated by reference in their entirety. These prismatic constructions can be manufactured in accordance with prismatic construction procedures disclosed in, for example, U.S. Pat. Nos. 3,810,804, 4,486,363, and 4,601,861, herein incorporated by reference in their entirety. It will be appreciated, any process and equipment can be used to incorporate the microprismatic retroreflective elements in or otherwise provide them on the underlayer colored fluorescent film 12.

The retroreflective feature provided by the retroreflective elements 16 is illustrated by the arrowed light pattern shown in FIG. 1. For simplicity of illustration, only two dimensions of this three-dimensional reflection are illustrated. This simplified light pattern shows an incident beam reflected twice by the fluorescent retroreflective sheeting 10 to provide a parallel reflected beam.

The underlayer colored fluorescent film 12 includes an underlayer polymer matrix and a first fluorescent colorant (e.g., pigment and/or dye) that is provided (e.g., dispersed or dissolved) in the underlayer polymer matrix. The overlayer colored fluorescent film 14 includes an overlayer polymer matrix and a second fluorescent colorant (e.g., pigment and/or dye) that is provided (e.g., dispersed or dissolved) in the overlayer polymer matrix. The first fluorescent colorant and the second fluorescent colorant provide fluorescent coloration, respectively, to the underlayer colored fluorescent film 12 and the overlayer colored fluorescent film 14.

The first fluorescent colorant and the second fluorescent colorant incorporated in, respectively, the underlayer polymer matrix and the overlayer polymer matrix are different to provide a multiple layer fluorescent sheeting (or film), which exhibits the fluorescent color needed for a particular application without having to physically place the fluorescent colorants in the same polymer matrix. With the respective fluorescent colorants within separate polymer matrices, any negative interaction which otherwise would be expected due to blending two fluorescent colorants (e.g., fluorescent dyes) together is eliminated. The combination of the overlayer colored fluorescent film 14 and the underlayer colored fluorescent film 12 according to the invention provides a superior light stable fluorescent sheeting article 10 with a fluorescent color, such as fluorescent yellow, that can be tailored to vary from fluorescent colors commonly available from fluorescent colorant (e.g., fluorescent dye) manufacturers, which each single film alone cannot achieve.

In accordance with an aspect of the invention, the underlayer colored fluorescent film 12 can have a fluorescent yellow-green coloration that is provided by at least one fluorescent yellow-green dye that is dissolved in the underlayer polymer matrix. The fluorescent yellow-green dye can have a first chemistry that is provided at least one fluorescent dye selected from the group consisting of benzothiazine dye, benzoxanthene dye, thioxanthene dye, and combinations thereof.

Exemplary fluorescent yellow-green dyes include those available under the trade names "Huron Yellow" and "Lumofast Yellow" from DayGlo Color Corporation, Cleveland, Ohio. Included are "Huron Yellow D-417" and "Lumofast Yellow D-150." Multiple versions may exist. When included within the underlayer polymer matrix of the underlayer fluorescent film 12 according to the invention, such a fluorescent dye gives excellent daytime luminance.

The fluorescent yellow-green dyes can be included in the underlayer polymer matrix in a range of about 0.02 to about 1.5 weight percent (e.g., between about 0.03 and about 1.3 weight percent) based upon the total weight of the matrix formulation. The weight loading of the fluorescent dye will depend upon the thickness of the underlayer colored fluorescent film 12 and the desired color intensity for a particular end use. For example, retroreflective articles generally require that this fluorescent dye should be of sufficient transparency such that the retroreflective function of the article is not significantly impaired.

The overlayer colored fluorescent film 14 can have a fluorescent orange coloration that is provided by at least one fluorescent orange dye or a combination of fluorescent red and/or fluorescent orange dyes that are dissolved in the overlayer polymer matrix. The fluorescent orange dye and/or fluorescent red dyes can comprise a fluorescent dye with a second chemistry that is different than the chemistry of the first fluorescent dye (i.e., first chemistry) and that is more compatible with the overlayer polymer matrix than a fluorescent dye having the first chemistry. By more compatible, it is meant that a fluorescent dye having a second chemistry has a greater UV and visible light durability (or stability) (e.g., less prone to fading when exposed to UV and visible light) when provided in the overlayer matrix than a fluorescent dye with a first chemistry.

The fluorescent dye with the second chemistry can include at least one perylene dye, such as a perylene imide dye. Exemplary perylene dyes are available from BASF (Rensselaer, N.Y.) under the "Lumogen" tradename. Examples include "Lumogen F Orange 240" and "Lumogen F Red 300".

The fluorescent orange and/or fluorescent red dyes can be included in the overlayer polymer matrix 14 in a range of about 0.005 to about 1.5 weight percent (e.g., between about 0.007 and about 1.3 weight percent) based upon the total weight of the matrix formulation. The weight loading of the fluorescent orange and/or fluorescent red dyes will depend upon the thickness of the overlayer fluorescent orange film 14 and the desired color intensity for a particular end use.

Advantageously, the fluorescent orange and/or combination of fluorescent orange and fluorescent red dyes used in the overlayer fluorescent orange film 14 can mitigate degradation (and/or fading) of the fluorescent yellow-green film 12. Fluorescent orange and/or combination of fluorescent orange and fluorescent red dyes used in the overlayer fluorescent orange film 14 are capable of at least partially blocking or absorbing visible light in a first wavelength range which can potentially cause degradation of the fluorescent yellow-green film while allowing transmission of an amount of visible light in a second wavelength range effective to make the fluorescent yellow-green dye fluoresce.

Figure 2:
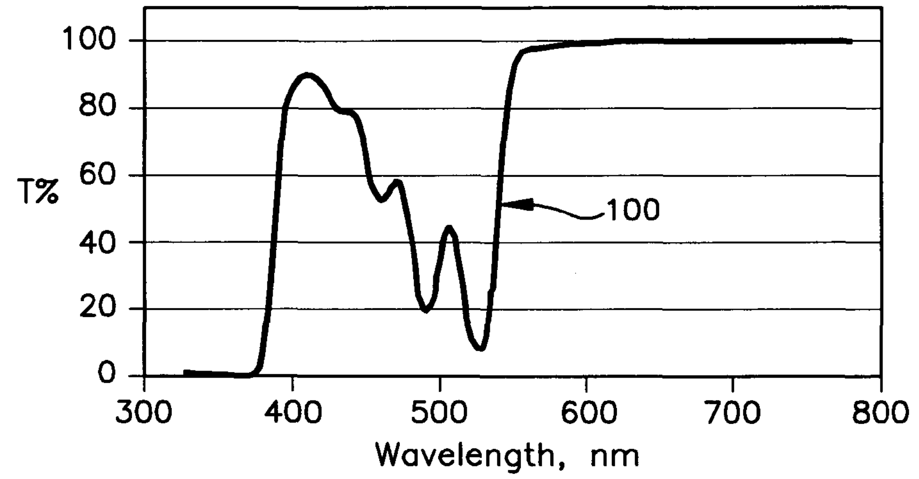
FIG. 2 illustrates a plot of the light transmission as a function of wavelength for a fluorescent orange acrylic film.

For example, FIG. 2 is a plot 100 illustrating the light transmission of an exemplary fluorescent orange film that can be used as an overlayer fluorescent orange film 14 in accordance with an aspect of the present invention. The fluorescent orange film substantially absorbs (or blocks) visible light from a wavelength of about 450 nm to about 540 nm while allowing transmission of light with a wavelength greater than about 540 nm. This can mitigate degradation of an underlayer fluorescent yellow-green film that is susceptible to degradation by visible light in the 450 nm to about 540 nm range.

The combination of such fluorescent orange and/or fluorescent red dyes in the overlayer fluorescent orange film 14 and a fluorescent yellow-green dye in the underlayer fluorescent yellow film 12 results in coloration and chromaticity values, which fall well within industry standards for fluorescent yellow sheeting.

The underlayer polymer matrix and the overlayer polymer matrix can comprise one or more polymers that can be readily compatible with as well as provide long-term stability to the respective fluorescent colorants employed in each respective polymer matrix. As the overlayer polymer matrix and the underlayer polymer matrix can be subject to differing light and/or environmental condition, they can have different compositions to accommodate such differing conditions. For example, the overlayer polymer matrix can be formulated so that it is more durable and/or weatherable than the underlayer polymer matrix. Moreover, as different fluorescent colorants having, respectively, different chemistries are employed in the overlayer polymer matrix and the underlayer polymer matrix, the polymers used in the overlayer polymer matrix and the underlayer polymer matrix can comprise different polymers.

In an aspect of the invention, the overlayer polymer matrix can comprise one or more polymers and be more weatherable as well as have a greater UV and/or visible light stability (or durablity) than the underlayer polymer matrix. By way of example, the overlayer polymer matrix can comprise an acrylic resin. The acrylic resin can readily incorporate one or more fluorescent orange and/or fluorescent red shade dyes (e.g., perylene imide fluorescent orange and/or fluorescent red dyes) and is very weatherable compared to other polymers (e.g., polycarbonate), which can be employed in fluorescent sheeting. An exemplary acrylic resin that responds to these objectives is polymethyl methacrylate (PMMA). A particular acrylic resin is sold under the trade designation "PSR-9" from Arkema.

The overlayer polymer matrix can include other polymers in addition to or besides an acrylic resin. These other polymers can include, for example, polycarbarbonates, polyesters, polystyrenes, styrene-acrylonitriles copolymers, polyurethanes, polyvinyl chlorides, polyarylates, such as disclosed in U.S. Pat. No. 6,514,594 (herein incorporated by reference in its entirety), and copolymers and combinations thereof. These other polymers when used in the overlayer polymer matrix can be formulated with an UV and/or visible light stabilizer that is effective to provide the overlayer polymer matrix with an enhanced UV and/or visible light stability compared to the underlayer polymer matrix.

In another aspect of the invention, the underlayer polymer matrix can comprise one or more polymers and have an enhanced fluorescent color stability compared to the overlayer polymer matrix. By way of example, the underlayer polymer matrix can comprise a polycarbonate polymer, such as Makrolon 3108 polycarbonate, which is commercially available from Bayer Inc. Polycarbonates provide superior fluorescent color stability and have a higher refractive index compared to other polymers (e.g., acrylics resin) typically employed in fluorescent sheeting. The use of a polycarbonate in the underlayer polymer matrix can provide the underlayer colored fluorescent film 12 with a higher refractive index than the overlayer colored fluorescent film 14. Providing the underlayer colored fluorescent film 12 with a higher refractive index than the overlayer colored fluorescent film 14 can provide the fluorescent retroreflective sheeting 10 with superior optical performance in terms of long and short distance reflectivity.

Additionally, polycarbonate is a relatively strong polymer with exceptional impact resistance and can readily incorporate the retroreflective elements 16, e.g., retroreflective microprismatic cubes. However, polycarbonate is not as light durable as an acrylic resin. By using a polycarbonate as the polymer of the underlayer polymer matrix and an acrylic resin as the polymer of the overlayer polymer matrix, the resulting fluorescent sheeting 10 combines the mechanical strength of polycarbonate and the light durability of an acrylic. This provides the resulting fluorescent sheeting 10 with a much stronger impact-resistance and light durability than acrylic or polycarbonate can achieve on their own. This impact resistance and light durability is desirable for outdoor signing applications where rocks or other objects may impact a sign face by passing automobiles.

In an aspect of the invention, when a fluorescent yellow retroreflective sheeting is required for particular uses, such as for extremely visible highway or warning signs, the underlayer colored fluorescent film 12 can include a polycarbonate matrix and have a fluorescent yellow-green coloration that is provided by a benzothiazine or a benzoxanthene fluorescent yellow-green dye. The overlayer colored fluorescent film 14 can include an acrylic matrix and have an orange coloration that is provided by a perylene imide fluorescent orange and/or fluorescent red dye. When assembled as a single article, a highly durable fluorescent yellow signage article with needed chromaticity can be provided.

It will be appreciated that although the underlayer polymer matrix can employ a polycarbonate other polymers can be employed. For instance, the underlayer polymer matrix can include acrylic polymers, polyarylates, and copolymers and combinations thereof.

Optionally, other generally known fluorescent film components can be included in either or both the overlayer polymer matrix and the underlayer polymer matrix. These other components can include, for example, UV absorbers and hindered amine light stabilizes (HALS). One or more of either or both can be included in any given polymer matrix. It is believed that the inclusion of the UV absorbers in the polymer matrices can retard degradation of the fluorescent colored article. Particularly, it is believed that benzotriazoles, benzophenones, and oxalanilides are UV absorbers, which may delay fading of the fluorescent colored article and enhance fluorescent durability.

Benzotriazole UV absorbers can be used within fluorescent colored polycarbonate matrix systems, particularly in the underlayer colored fluorescent film 12 of the present multiple layered articles. UV absorbers showing good compatibility with benzothiazine dyes are useful when such dyes are incorporated within a polymer matrix. Examples of available benzotriazole UV light absorbers include 2-(2H-benzotriazol-2-yl)-4,6-bis-(1-methyl-1-phenylethyl)phenol, sold under the trade name "Tinuvin 234" by Ciba-Geigy, and 2-(4,6-diphenyl-1,3,5-triazine-2-yl)-5(hexyl)oxyphenol, sold commercially by Ciba-Geigy as "Tinuvin 1577".

Examples of commercially available benzophenone UV light absorbers include 2-hydroxy-4-n-octoxybenzophenone commercially available from Great Lakes Chemical Corporation under the trade name "Lowilite 22", 2,2-dihydroxy-4, 4-dimethoxybenzophenone available under the trade name "Uvinul 3049" from BASF, and 2,2',2,4'-tetrahydroxybenzophenone available under the trade name "Uvinul 3050" from BASF. It has been found that these benzophenone types of UV absorbers are particularly useful for a fluorescent colored acrylic matrix.

Individuals skilled in the art will recognize that many other UV light absorbers exist and may be suitable for use in the present invention.

In general, hindered amine light stabilizers (HALS) have been found to be useful to delay fading of fluorescent dyes. Oligomeric or polymeric HALS compounds having molecular weights of about 1500 and greater provide enhanced fluorescence durability. A combination of UV absorber and HALS compound generally helps to further prevent color fading and enhances color durability. Examples, of HALS compounds are oligomeric hindered amine compounds from Great Lakes Chemical under the trade name "Lowilite 62", or "Tinuvin 622" available from Ciba-Geigy.

HALS compounds can include, for example: dimethyl succinate polymer with 4-hydroxy-2,2,6,6-tetramethyl-1-piperidineethanol, commercially available from Ciba Specialty Additives as "Tinuvin 622"; poly[[6-[(1,1,3,3,-tetramethylbutyl)amino]-s-triazine-2,4-diyl][[(2,2,6,6,-tetramethyl-4-piperidyl-)imino]hexamethylene [(2,2,6,6-tetramethyl-4-piperidyl)imino]] commercially available from Ciba Specialty Additives under the trade name Chimassorb 944; "Tinuvin 791" which is available from Ciba Specialty Additives and is a blend of poly[[6-1,3,3,-tetramethylbutyl)amino]-s-triazine-2,4-diyl][[(2,2,6,6,-tetramethyl-4-piperidyl)imino]hexamethylene[(2,2,6,6-tetramethyl-4-piperidyl)]imino]] and bis (2,2,6,6-tetramethyl-4-piperidynyl)sebacate; and "Hostavin N30" available from Clariant. Those skilled in the art will recognize that many other hindered amine light stabilizers exist and may be suitable for use in the present invention.

The polymer component of the overlayer polymer matrix and the underlayer polymer matrix makes up a substantial percent by weight of each polymer matrix. The polymer component ranges between about 90 and about 99.99 weight percent of the formulation making up each polymer matrix, for example, between about 95 and about 99 weight percent. When present, a UV absorber is provided at levels between about 0.1 and about 5 weight percent, for example, between about 0.3 and about 3 weight percent, based upon the total weight of the polymer matrix formulation. When a HALS component is present, it can be provided at between about 0.1 and about 2 weight percent, for example, between about 0.3 and about 1.5 weight percent, based upon the total weight of the formulation making up each polymer matrix.

The thickness of the overlayer colored fluorescent film 14 and the thickness of the underlayer colored fluorescent film 12 can vary somewhat depending upon the particular fluorescent article being prepared. Typically, the overlayer colored fluorescent film 14 can have a thickness of between about 2 mils and about 20 mils (0.05 mm to 0.5 mm), more typically between about 3 mils and about 10 mils (0.075 mm to 0.25 mm). A typical underlayer colored fluorescent film 12 will have a thickness of between about 2 mils and about 20 mils (0.05 mm to 0.5 mm), more typically between about 3 mils and about 10 mils (0.075 mm to 0.25 mm).

The fluorescent retroreflective sheeting 10 in accordance with the invention can be formed by laminating the underlayer colored fluorescent film 12 and overlayer colored fluorescent 14, such as by heat and/or pressure application using conventional equipment. Depending upon the particular use of the fluorescent retroreflective sheeting according to the invention, optional tie layers can be provided between the underlayer colored fluorescent film 12 and the overlayer colored fluorescent film 14. A laminating adhesive can also be included to the extent deemed necessary for a particular construction or end use needs. Any such tie layer or adhesive layers so included can be selected so as to not significantly detract from the properties to which the multiple layered fluorescent retroreflective sheeting article according to the invention is directed.

Optionally, a surface of one or more of the films 12 and 14 can be pre-printed with desired indicia so that a finished laminar or multiple-layered structure has the desired indicia on an inner surface, such as disclosed in U.S. Pat. Nos. 5,213,872 and 5,310,436, herein incorporated by reference in their entirety.

Figure 3:
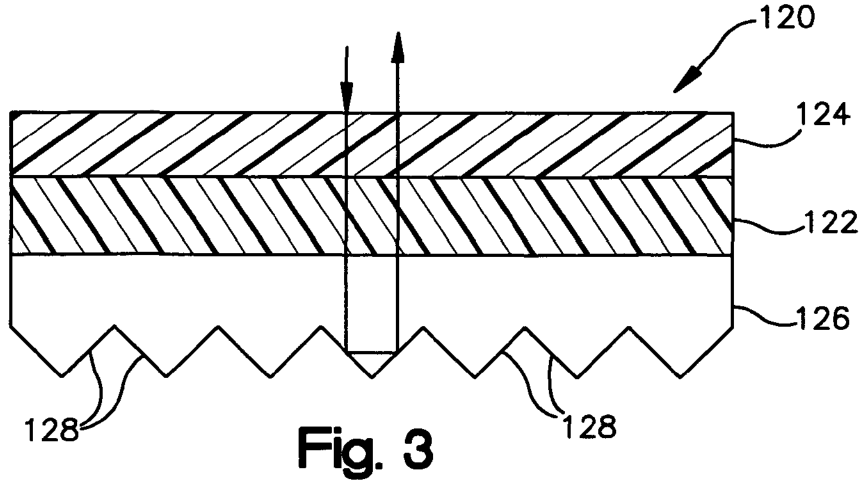
FIG. 3 illustrates a cross-sectional view of a fluorescent sheeting having multiple colored film layers over clear microprismatic retroreflective elements in accordance with another aspect of the invention.

FIG. 3 illustrates a multiple layered fluorescent retroreflective sheeting 120 in accordance with another aspect of the invention. The multiple layered fluorescent retroreflective sheeting 120 in accordance with this aspect comprises an underlayer colored fluorescent film 122 and an overlayer colored fluorescent film 124, similar to the underlayer colored fluorescent film 12 and the overlayer colored fluorescent film 14 illustrated in FIG. 1, as well as a retroreflective layer 126 that includes a plurality of retroreflective elements 128. The retroreflective layer 126 can be made of a clear polymer that is suitable for embossing or forming, retroreflective elements 128, such as microprismatic corner cubes. With this arrangement, the multiple layers of fluorescent polymer, i.e., the underlayer colored fluorescent film 122 and the overlayer fluorescent colored film 124, do not include any retroreflective elements 128.

The retroreflective feature provided by the retroreflective elements 128 is illustrated by the arrowed light pattern shown. For simplicity of illustration, only two dimensions of this three-dimensional reflection are illustrated. This simplified light pattern show an incident beam reflected twice by the fluorescent retroreflective sheeting 120 to provide the parallel reflected beam.

Figure 4:
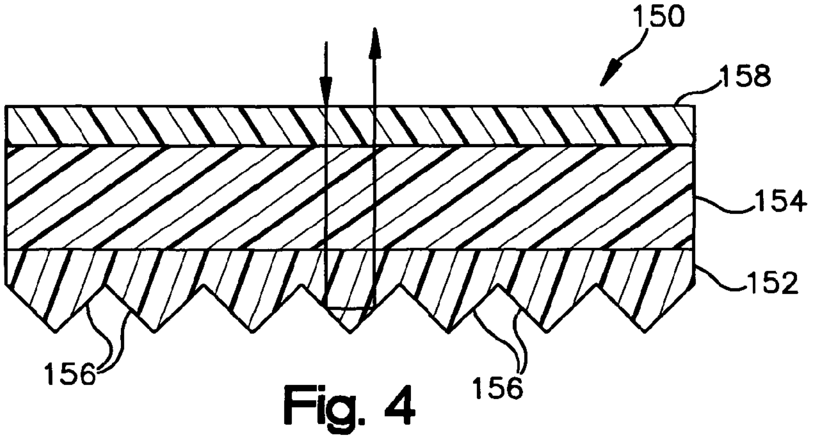
FIG. 4 illustrates a cross-sectional view of a fluorescent sheeting having multiple film layers and including an external supplemental protective layer in accordance with another aspect of the invention.

FIG. 4 shows a fluorescent retroreflective sheeting 150 in accordance with another aspect of the invention similar to the fluorescent retroreflective sheeting 10. The fluorescent retroreflective sheeting 150 includes an underlayer colored fluorescent film 152, an overlayer colored fluorescent film 154, a plurality of retroreflective elements 156 and a cap or cover layer 158. The cap or cover layer 158 can potentially provide various functions or properties to the fluorescent retroreflective sheeting 150. These functions or properties can include, for example, providing UV screening to retard chalking and hazing of polymers (e.g., polycarbonate) used in the fluorescent retroreflective sheeting 150. UV screening can be provided by including an ultraviolet light absorbing compound or compounds into the cap or cover layer 158. Alternatively, UV screening can be provided by including a polymer in the cap or cover layer 158, which is itself an absorber of ultraviolet light. A polyarylate matrix is suitable in this regard as referenced hereinabove. The cap or cover layer 158 can also be used to enhance scratch resistance and graffiti protection. For example, the cap or cover layer 158, can comprise a hard coat silicone based polymer, such as is commercially available from GE Silicones, N.Y. Additionally, the cap or cover layer 158 may be selected to have other properties desirable for the front surface of a sign or the like, such as dew resistance and/or ease of printing.

The cap or cover layer 158 thickness can range between about 1 mil and about 10 mils (0.025 mm to 0.25 mm). For example, the cap or cover layer thickness can range between about 2 mils and about 5 mils (0.05 mm to 0.125 mm), and particularly between about 2 mils and about 4 mils (about 0.05 mm to about 0.100 mm).

Figure 5:
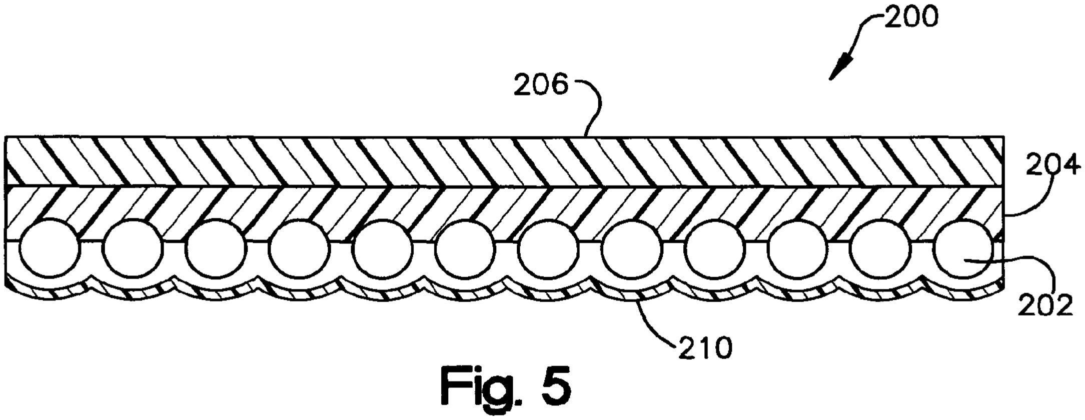
FIG. 5 illustrates a cross-sectional view of an enclosed lens retroreflective sheeting material where the fluorescent sheeting having multiple film layers is disposed over an enclosed lens structure in accordance with another aspect of the invention.

FIG. 5 illustrates that a fluorescent retroreflective sheeting in accordance with the invention can be incorporated in an enclosed lens retroreflective sheeting article 200. Enclosed lens retroreflective sheeting is well known in the art. An early teaching in this regard is U.S. Pat. No. 2,407,680, herein incorporated by reference in its entirety, which discloses lenses, such as glass microspheres embedded in a sheeting structure with a flat, transparent cover film. In FIG. 5, glass microspheres 202 are embedded in an underlayer colored fluorescent film 204 that is provided below an overlayer colored fluorescent film 206. A specularly reflective layer 210 (e.g., vacuum deposited aluminum) can be provided in accordance with known art. The retroreflective nature of this enclosed lens structure is illustrated by the simplified two-dimensional arrowed light beam path which is shown to pass through the overlayer colored fluorescent film 206, the underlayer colored fluorescent film 204, into and through the microspheres 206, and back.

It is also possible to have the overlayer colored fluorescent film 206 and underlayer colored fluorescent film 204 laminated together and have an adhesive layer (not shown) which is transparent to join the microspheres 202 and the underlayer colored fluorescent film 204. In this instance, the microspheres 202 are embedded in the adhesive much as the underlayer colored fluorescent film 202 embeds the tops of the microspheres in FIG. 5.

Figure 6:
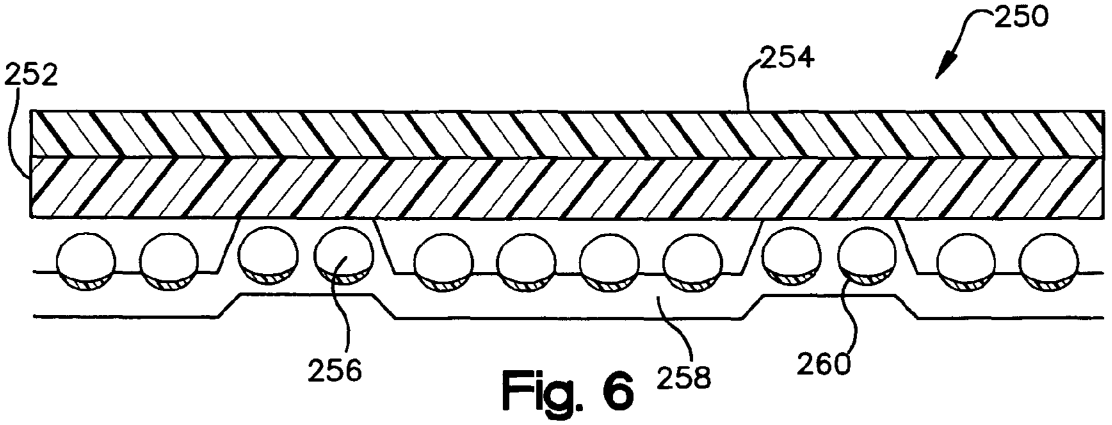
FIG. 6 is a cross-sectional illustration of an encapsulated lens retroreflective sheeting material where the fluorescent sheeting having multiple film layers is disposed over an encapsulated lens structure in accordance with another aspect of the invention.

FIG. 6 illustrates how a fluorescent retroreflective sheeting in accordance with the present invention can incorporated into an encapsulated lens retroreflective sheeting article. The fluorescent retroreflective sheeting article 250 includes an underlayer colored fluorescent film 252, an overlayer colored fluorescent film 254. A monolayer of lenses 256, such as glass microspheres, is at least partially embedded in a binder layer 258. The underlayer colored fluorescent film 252 is sealed to the binder layer to hermetically seal the lenses 256. The illustrated lenses 256 have their own reflective surfaces 260 to provide reflection according to the pattern indicated by the arrowed light path.

EXAMPLES

The following Examples are provided for purposes of illustration and explanation. The films used in these Examples were made using a laboratory Killion single screw extruder with three heating zones or with the use of a Brabender mixer. In the single screw extruder set up, a mixture of the indicated polymer resins, the indicated dye and other additives such as UV light stabilizer and/or HALS was extruded into a film of about 6 mils (0.15 mm) thick. As an example, for the acrylic matrix film, the temperature zone settings were typically at 254° C., 238° FC, and 226° C. For polycarbonate film, the temperature zone settings typically were at 277° C., 282° C., and 287° C. The extrusion screw speed was 27 rpm.

When the mixer was used, the equipment was a C. W. Brabender Plasti-Corder Prep-Mixer (manufactured by C. W. Brabender Instruments, Inc. of Hackensack, N.J.). The material was compounded through melt mixing of polymer resins and other components and then converted into films of about 4 to about 6 mils (about 0.150 mm) using a heated platen press. Mixing temperatures were in the range of between about 220° C. and about 270° C., depending upon the particular polymer resin, and the mixing speed was 100 rpm for a mixing time of between about 3 and about 6 minutes. The thus prepared different films were laminated together at about 185° C. using a Hot Roll Laminator M from Cheminstruments.

After preparing the samples, each was placed into a Xenon Arc accelerated weathering unit and color measurements were routinely measured. The test methodology used for the Xenon Arc weathering is outlined in ASTM G26-90, Section 1.3.1. Borosilicate inner and outer filters were used, and the irradiance level was set to 0.35 $W/m^2$ at 340 nm. Color measurements were taken on a Hunter Lab LS6000 instrument using a D65 light source, 2° observer, and a 0/45 geometric configuration. To determine the extent of fading and color shifts, the CIE $\Delta E^*$ color difference factor was calculated to compare color measurements after accelerated weathering exposure with initial measurements made prior to weathering. A small value for the CIE ΔE * color difference factor indicates small differences in color. A value of about 2 or 3 is barely detectable to the human eye.

Example 1

A fluorescent yellow-green polycarbonate layer was laminated with different fluorescent orange acrylic films. The fluorescent yellow-green polycarbonate film was made by blending Makrolon 3108 polycarbonate pellets (available from Bayer) with 0.18% Huron Yellow D-417 (available from Day-Glo Color) (sample 1-1). Sample 1-2-1 is a fluorescent orange acrylic film, which is a blend of acrylic PSR-9 (available from Arkema) and 0.175% Lumogen F Orange 240 (available from BASF). Sample 1-2-2 is a laminated film of sample 1-1 and sample 1-2-1. Sample 1-3-1 is a fluorescent orange acrylic film, which is a blend of acrylic PSR-9, 0.136% Lumogen F Orange 240, 0.0025% Lumogen F Red 300 (available from BASF), and 0.0624 Oracet Yellow GHS (available from Ciba). Sample 1-3-2 is a laminated film of sample 1-1 and sample 1-3-1. The resulting chromaticity of individual and combined films are shown in Table 1 and FIG. 7.

TABLE 1

| | | Chromaticity Coordinates | | |
|---|---|---|---|---|
| Sample | Film Structure | x | y | Y |
| 1-1 | Single FYG PC film | 0.4476 | 0.5313 | 86.75 |
| 1-2-1 | Single FO acrylic film | 0.4547 | 0.3970 | 74.39 |
| 1-2-2 | Laminated film of samples 1-1 and 1-2-1 | 0.5167 | 0.4783 | 67.41 |
| 1-3-1 | Single FO acrylic film | 0.4991 | 0.4419 | 65.21 |
| 1-3-2 | Laminated film of samples 1-1 and 1-3-1 | 0.5205 | 0.4754 | 60.02 |

Figure 7:
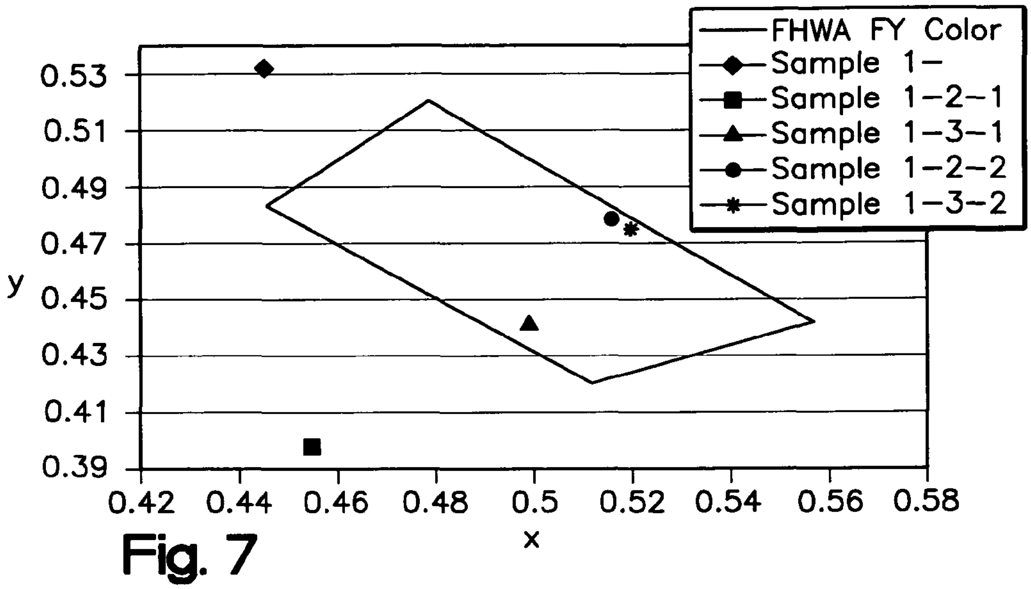
FIG. 7 is a plot of "x" and "y" color chromaticity values in terms of the CIE 1931 Standard Colorimetric System for film structures with respect to target fluorescent yellow values in accordance with an aspect of the invention.

The results in Table 1 and FIG. 7 illustrate that the desirable fluorescent yellow color has been achieved by the combination of a fluorescent yellow-green film and a fluorescent orange film. Either single fluorescent color layer can not make the desired fluorescent yellow color.

Example 2

Example 2 demonstrates the conversion of laminated film into fluorescent yellow retroreflective sheeting. By using a well-known embossing technique, the above laminated raw films were converted into retroreflective road sign sheeting. Through embossing process, a plurality of microprismatic corner cube elements was formed directly into the rear surface of the fluorescent film. Then, a finished retroreflective sheeting was made by laminating a white backing film on the embossed film. The color and Cap-Y of the finished fluorescent yellow retroreflective sheeting made using the same films as samples 1-2-2 and 1-3-2 with white backing film are shown in Table 2 and FIG. 8.

TABLE 2

| | | Chromaticity Coordinates | | |
|---|---|---|---|---|
| Sample | Retroreflective Sheeting Type | x | y | Y |
| 2-1 | Finished retroreflective sheeting based on sample 1-2-2 film | 0.5175 | 0.4782 | 77.85 |
| 2-2 | Finished retroreflective sheeting based on sample 1-3-2-film | 0.5238 | 0.4727 | 68.69 |

Figure 8:
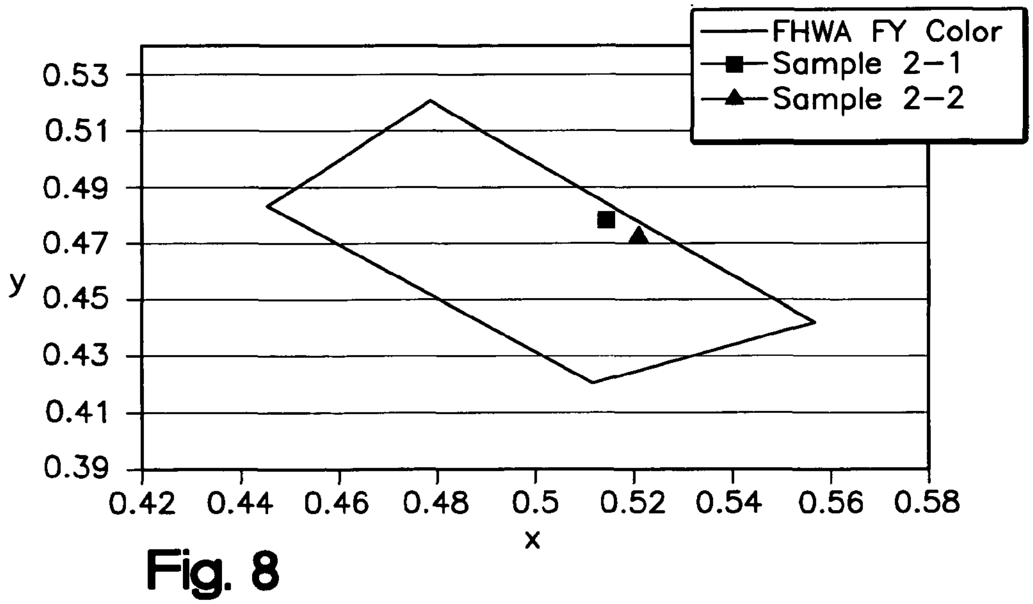
FIG. 8 is a plot of "x" and "y" color chromaticity values in terms of the CIE 1931 Standard Colorimetric System for film structures with respect to target fluorescent yellow values in accordance with another aspect of the invention.

The results in Table 2 and FIG. 8 show that retroreflective sheeting with desirable fluorescent yellow color has been achieved by the technique of the present invention.

Example 3

Example 3 demonstrates the durability of resulting fluorescent yellow retroreflective sheeting made by laminating a fluorescent yellow green polycarbonate as lower layer and a fluorescent orange acrylic film as upper layer. It is well known in the art that polycarbonate is not a light durable polymer. By using a strong light screening fluorescent acrylic layer on the top of polycarbonate layer, a superior durable fluorescent yellow sheeting was created. If necessary, another durable acrylic film could be used to make the overall structure with better performance in other aspects, such as scratch resistance. The weathering results are shown in Table 3.

TABLE 3

| | | ΔE* of Samples Exposed at indicated Period of Time (Hours) | | |
|---|---|---|---|---|
| Sample | Film Structure | 500 | 1500 | 2500 |
| 3-1 | 1 mil HBS (acrylic on the top of sample 2-1 | 1.68 | 6.30 | 11.1 |
| 3-2 | 1 mil HBS (Acrylic) on the top of sample 2-2 | 1.23 | 3.55 | 11.07 |

The results in Table 3 illustrate that the resulting fluorescent yellow retroreflective sheetings have exceptional light durability.

The above examples show that the two fluorescent color layer technology works extremely well in polycarbonate/acrylic system. The same concept can be used on other polymers such as polyester, polystyrene, polyvinyl chloride, polyurethane, and styreneacrylonitrile copolymer, and other fluorescent dyes such as perylene imide, thioxanthene dyes, thioxanthene, thioindigoid, naphthalimide, and coumarin to create other colors depending on applications and polymers selected.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, the following is claimed:

1. A fluorescent article comprising:

an underlayer colored fluorescent film that includes a first fluorescent colorant in an underlayer polymer matrix;

an overlayer colored fluorescent film provided over the underlayer film, the overlayer film including a second fluorescent colorant in an overlayer polymer matrix, the second fluorescent colorant at least partially blocking light in a first wavelength range while allowing transmission of an amount of light in a second wavelength range effective to make the first fluorescent colorant fluoresce;

the underlayer having a greater fluorescent color stability than the overlayer;

a retroreflective layer including a plurality of retroreflective elements beneath the overlayer and the underlayer; and a cap layer overlying the overlayer.

2. The fluorescent article of claim 1, the first fluorescent colorant having a first chemistry and the second fluorescent colorant having a second chemistry different than the first chemistry.

3. The fluorescent article of claim 1, the second fluorescent colorant comprising a fluorescent perylene dye.

4. The fluorescent article of claim 1, the overlayer colored fluorescent film having a fluorescent orange coloration provided by the second fluorescent colorant, the second fluorescent colorant comprising at least one of a red-shade fluorescent dye or orange-shade fluorescent dye.

5. The fluorescent article of claim 1, the first fluorescent colorant comprising a fluorescent dye selected from the group consisting ofbenzothiazine, thioxanthene, and benzoxanthene.

6. The fluorescent article of claim 1, the underlayer colored fluorescent film having a fluorescent yellow-green coloration provided by the first fluorescent colorant, the first fluorescent colorant comprising a yellow-green shade fluorescent dye.

7. The fluorescent article of claim 1, the fluorescent coloration of the article being fluorescent yellow.

8. The fluorescent article of claim 1, the overlayer polymer matrix comprising at least one acrylic resin or a UV stabilized polymer.

9. The fluorescent article of claim 1, the underlayer polymer matrix comprising a polycarbonate polymer.

10. The fluorescent article of claim 1, further comprising retroreflective elements, the underlayer colored fluorescent film being provided between the overlayer colored fluorescent film and the retroreflective elements.

11. The fluorescent article of claim 10, the retroreflective elements being formed into a surface of the underlayer colored fluorescent film opposite the overlayer colored fluorescent film.

12. A fluorescent yellow article comprising:

an underlayer fluorescent yellow-green film that includes at least one colored fluorescent dye dissolved within an underlayer polymer matrix;

an overlayer fluorescent orange film provided over the underlayer film, the overlayer film including at least one colored fluorescent dye dissolved within an overlayer polymer matrix;

the underlayer having a greater fluorescent color stability than the overlayer;

a retroreflective layer including a plurality of retroreflective elements beneath the overlayer and the underlayer; and a cap layer overlying the overlayer.

13. The fluorescent yellow article of claim 12, the fluorescent yellow-green coloration of the underlayer fluorescent yellow-green film being provided by a fluorescent dye comprising a yellow-green shade fluorescent dye.

14. The fluorescent yellow article of claim 13, the fluorescent dye of the underlayer fluorescent yellow-green film being selected from the group consisting of benzothiazine, tbioxanthene, and benzoxanthene.

15. The fluorescent yellow article of claim 12, the fluorescent orange coloration of the overlayer fluorescent orange film being provided by a fluorescent dye comprising at least one red-shade fluorescent dye or orange-shade fluorescent dye.

16. The fluorescent yellow article of claim 15, the fluorescent dye of the overlayer fluorescent orange film comprising a fluorescent perylene dye.

17. The fluorescent yellow article of claim 12, the overlayer polymer matrix comprising at least one acrylic resin or UV stabilized polymer.

18. The fluorescent yellow article of claim 12, the underlayer polymer matrix comprising a polycarbonate polymer.

19. A fluorescent yellow retroreflective article comprising:

an underlayer fluorescent yellow-green film that includes at least one colored fluorescent dye dissolved in a underlayer polymer matrix, the underlayer polymer matrix including a polycarbonate; and an overlayer fluorescent orange film provided over the underlayer film, the over layer film including at least one colored fluorescent dye dissolved in an overlayer polymer matrix, the overlayer polymer matrix including an acrylic resin;

the underlayer having a greater fluorescent color stability than the overlayer;

a retroreflective layer including a plurality of retroreflective elements beneath the underlayer and the overlayer; and a cap layer overlying the overlayer.

20. The fluorescent yellow retroreflective article of claim 19, a fluorescent yellow-green coloration of the underlayer fluorescent yellow-green film being provided by a fluorescent dye comprising a yellow-green shade fluorescent dye selected from the group consisting ofbenzothiazine, thioxanthene, and benzoxanthene.

21. The fluorescent yellow retroreflective article of claim 19, a fluorescent orange coloration of the overlayer fluorescent orange film being provided by a fluorescent dye comprising at least one of red-shade fluorescent dye or orange-shade fluorescent dye, comprising at least one perylene dye.

22. The fluorescent yellow retroreflective article of claim 19, the underlayer polymer matrix having a higher refractive index than the overlayer polymer matrix.

23. The fluorescent yellow retroreflective article of claim 19, further comprising retroreflective elements, the underlayer fluorescent yellow-green film being provided between the overlayer fluorescent orange film and the retroreflective elements.

24. The fluorescent yellow retroreflective article of claim 19, having chromaticity coordinates (x,y) within the area defined by (x=0.479, y=0.520), (x=0.446, y=0.483), (x=0.512, y=0.421), and (x=0.557, y=0.442).

* * * * *